July 28, 1936.　　　G. U. BRAKE　　　2,049,405
LIQUID DISPENSER
Filed Feb. 1, 1934　　　3 Sheets-Sheet 1
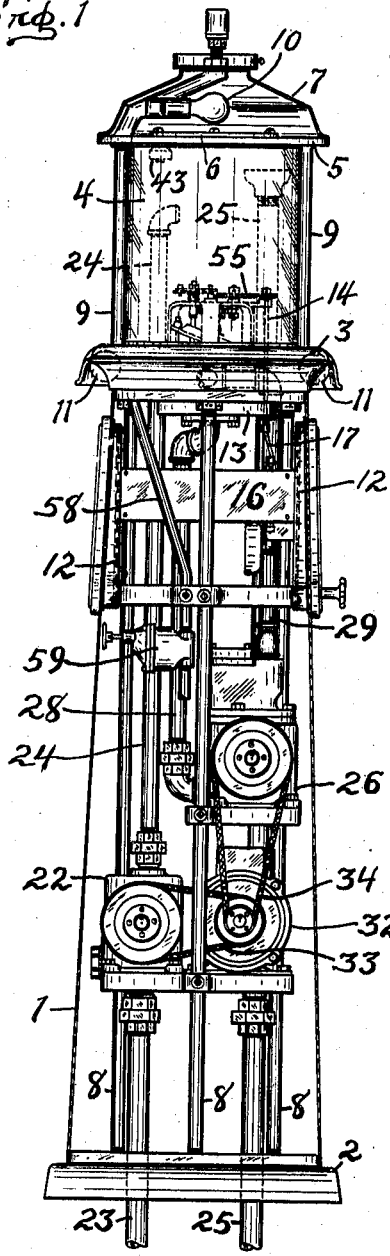
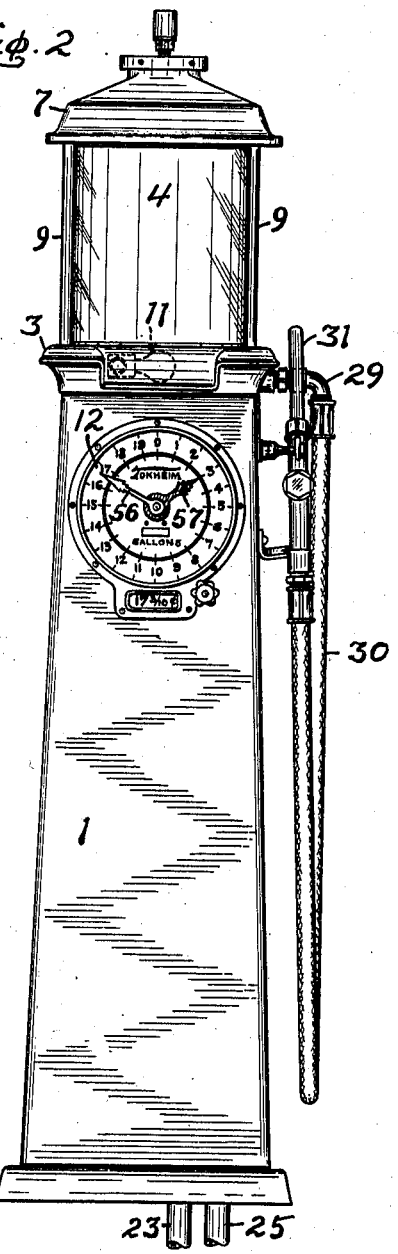
George U. Brake INVENTOR.
BY
A. G. Burns ATTORNEY.

July 28, 1936. G. U. BRAKE 2,049,405
LIQUID DISPENSER
Filed Feb. 1, 1934 3 Sheets-Sheet 2

George U. Brake
INVENTOR.
BY H. G. Burns
ATTORNEY.

July 28, 1936.  G. U. BRAKE  2,049,405
LIQUID DISPENSER
Filed Feb. 1, 1934   3 Sheets-Sheet 3
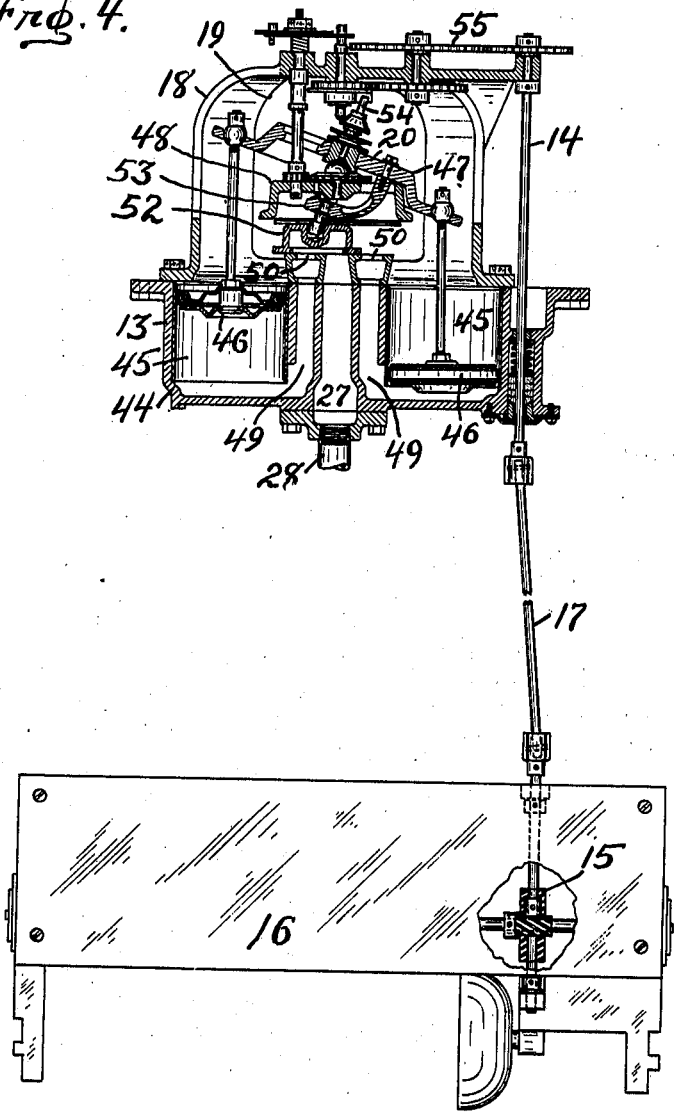
George U. Brake INVENTOR.
BY
H. G. Burns ATTORNEY.

Patented July 28, 1936

2,049,405

UNITED STATES PATENT OFFICE 2,049,405

LIQUID DISPENSER

George U. Brake, Fort Wayne, Ind., assignor to Tokheim Oil Tank and Pump Company, Fort Wayne, Ind., a corporation of Indiana Application February 1, 1934, Serial No. 709,256

5 Claims. (Cl. 221—95)

This invention relates to improvements in liquid dispensers such as are employed at filling stations for supplying automobiles with fuel. An object of the invention is to provide an apparatus for withdrawing liquid fuel from a storage tank and delivering it in a complete state of liquidity at the point of delivery and by which is accurately indicated the volume of liquid actually delivered upon each operation thereof. Another object is to so construct the dispenser that the liquid, to be delivered in measured quantities, and the measuring meter are displayed so as to be observed by the patron by which he may ascertain whether or not the dispenser is properly functioning. Other objects and advantages of the invention will appear in the following description.

An illustrative embodiment of the invention is shown in the accompanying drawings, in which:—

Fig. 1 is a side elevation of a dispenser in which the invention is embodied, parts thereof being in section;

Fig. 2 is a front elevation projected from Fig. 1;

Fig. 4 is an elevation of the meter and a portion of the counter mechanism, the meter being in section and a portion of the counter mechanism being broken away.

The dispenser

Figure 3:
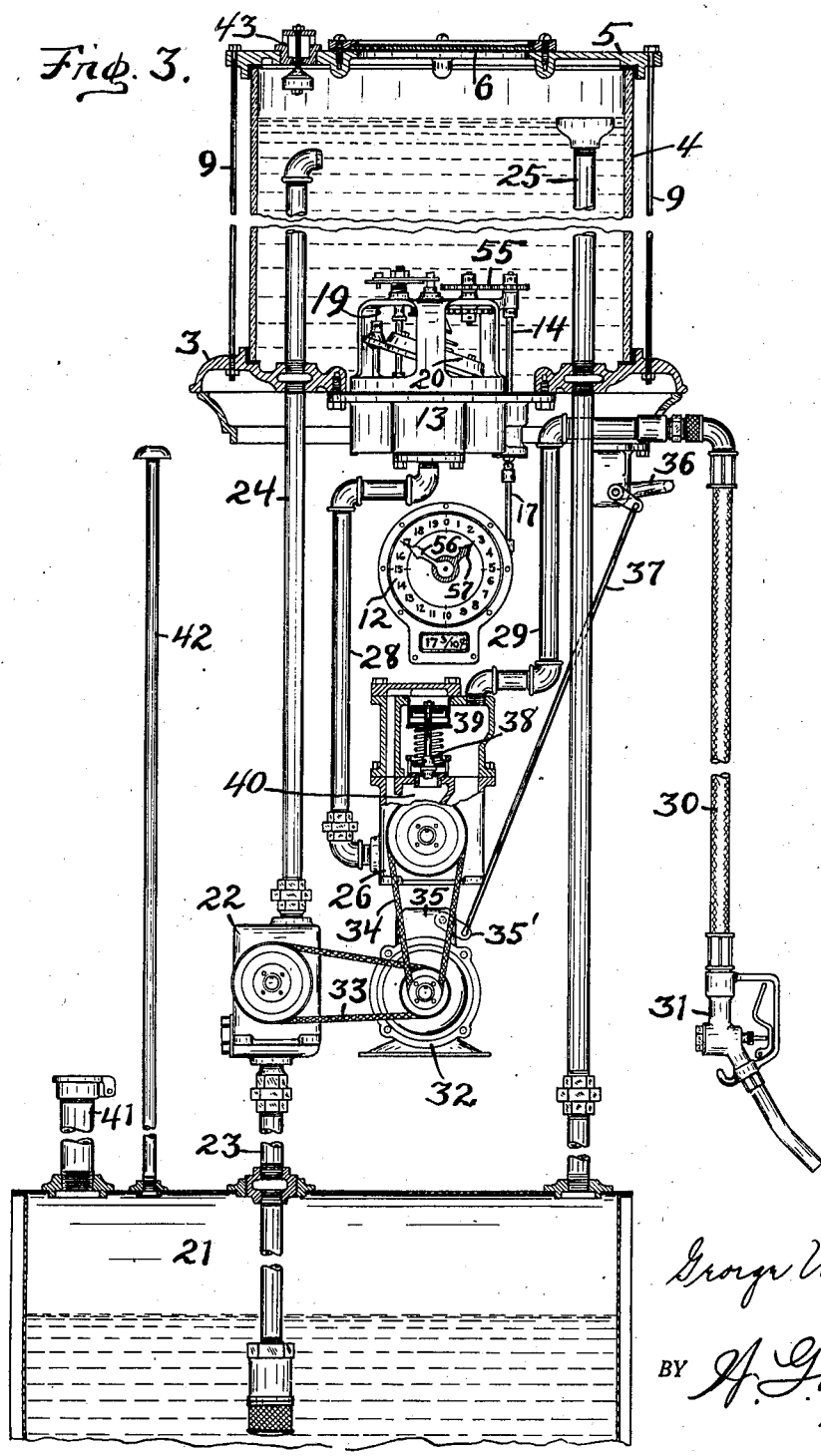
Fig. 3 is a diagram showing the general arrangement of the elements embodied in a complete installation in which the invention is employed, parts being broken away and other parts being in section.

The illustrative embodiment of the invention consists of a pedestal constituting a housing 1 having a base 2 and capital 3. Upon the capital is mounted a transparent vessel consisting of a glass cylinder 4 that is closed at its bottom by the capital 3 and at its top by a head 5 provided with a removable transparent lid 6, and covering the head and its lid is provided a dome 7. The base 2 and capital 3 are secured together by means of struts 8 arranged within the housing 1, and the capital 3 and head 5 are connected together by tie rods 9 preferably disposed exteriorly with respect to the cylinder 4.

In the dome is disposed an electric lamp 10 from which light is shed through the lid 6 into the glass cylinder, and in the capital 3 are disposed lamps 11 arranged for illumination of dials 12 that are positioned upon the front and back of the housing 1.

Positioned in the capital 3 is a meter 13 preferably of the type shown in Fig. 4, the operating stem 14 of which is connected with gearing 15 of a suitable indicating mechanism 16 by means of a coupling 17.

The upper portion 18 of the meter housing extends up into the glass cylinder 4 and is provided with large openings 19 so that the meter mechanism 20 is exposed to view and through which liquid is received into the meter from the contents of the cylinder.

The vessel is supplied with liquid drawn from a storage tank 21 by means of a filling pump 22 which is connected with said tank by a suction pipe 23 and with said vessel by a supply pipe 24. The vessel is provided with an overflow pipe 25 that is connected with the storage tank so that surplus liquid that enters the vessel by the pump 22 returns by gravitation to the storage tank through said overflow pipe.

Liquid is withdrawn from the vessel by means of a dispensing pump 26 which is connected with the outlet chamber 27 of the meter 13 by a suction pipe 28 and with the dispensing pipe 29 that terminates with a hose 30 provided with a manually-operated valve-controlled nozzle 31. Upon operation of the dispensing pump 26 when the nozzle is opened liquid is drawn from the vessel through the meter causing operation thereof and discharge of liquid through the dispensing line to the customer.

The capacity of the filling pump 22 is greater than that of the dispensing pump 26 so that the amount of liquid supplied to the vessel is sufficient to maintain a surplus of liquid in the vessel and continuous overflow through the overflow pipe into the storage tank and so that the meter in the vessel is constantly submerged during the withdrawal of liquid from the vessel through the dispensing pump.

Both of the pumps 22 and 26 are operatively connected with an electric motor 32 to be simultaneously actuated thereby, such as by means of corresponding endless belts or chains 33 and 34, and the motor has a switch 35 connected in the motor circuit in the usual manner, the switch being provided with operating means consisting preferably of a hose hook 36 that is connected with the switch lever 35' by a rod 37 so that when the hose nozzle 31 is hung upon the hook 36 the switch 35 will thereupon be opened and operation of the motor stopped.

The dispensing pump 26 is provided with a spring-restrained by-pass valve 38 of any suitable construction which automatically is opened when the pressure in the discharge chamber 39 of the pump 26 is raised to a predetermined point thus permitting the liquid to pass from said discharge chamber into the suction chamber 40 and circulate in the pump whereby stalling of the pump is prevented. Preferably, the by-pass valve has the same general characteristics of the similar by-pass valve shown in Letters Patent No. 1,930,438 issued October 10, 1933.

The storage tank 21 is provided with the usual fill-pipe 41 and vent-pipe 42, and in the head 5 of the vessel is provided a float-valve-controlled vent outlet 43, the purpose of which is to permit escape of air or gas from the vessel that becomes separated from the liquid in the vessel and to prevent escape of liquid through such vent.

The meter

The meter preferably is of a type having a cylinder-block 44 provided with a series of piston chambers 45 in which plungers 46 operate reciprocally. The plungers are connected respectively with a nutating member 47 that is pivotally disposed upon a stationary table 48 in the meter housing. The piston chambers have corresponding ports 49 that communicate with the lower ends thereof and extend up through individual openings 50 in a valve seat 51 disposed upon the cylinder block. The port openings are controlled by a slide valve 52 that rests upon the valve seat and is operated by an arm that is secured to the nutating member. As the valve is actuated the individual openings 50 are alternately exposed to receive liquid from the vessel which permit the liquid to enter through the ports 49 into the lower ends of said chambers during the upstroke of the corresponding plungers, and then connected by the valve 52 with the outlet chamber 27 during the downstroke of said plungers which is caused by suction of the dispensing pump. The nutating member has an axial finger 54 that is operatively associated with the meter stem 14 through the medium of suitable gear mechanism 55 so that upon operation of the plungers said meter stem 14 is revolved to a proportionate extent.

The indicator mechanism

The particular construction of the indicator mechanism is immaterial to the present invention as any suitable device may be employed that may be operated by the meter stem and automatically indicate the quantity or value of liquid drawn through the meter and dispensed. In the drawings is shown, as an example, indicating mechanism arranged to be operated by the meter stem 14 in the usual manner. The mechanism 16 is mounted in the pedestal and connected with pointers 56 and 57 that are disposed to circulate in front of the dials 12 as in the usual practice. Thus, as liquid is discharged from the dispensing nozzle after being drawn through the meter the pointers are progressed to such an extent as to indicate the quantity of liquid so discharged.

The electrical circuits (not shown) for the motor and the lamps are conveniently arranged and distributed through a conduit structure 58 in the usual manner and are controlled by a conveniently located switch 59 so that said circuits are energized from a suitable source of current (not shown) by manipulation of said switch.

Operation

When liquid is to be dispensed from the apparatus the nozzle 31 is removed from the hose hook 36 which is then raised causing the motor switch 35 to close, whereupon both of the pumps 22 and 26 are set in motion and the vessel becomes filled with liquid from the storage tank through operation of the filling pump 22 and an overflow of liquid from the vessel is established which passes out through the overflow pipe 25 back into the storage tank, during which operation air and gas occasioned by effervescence of the liquid or which is due to agitation of the liquid as it is supplied to the vessel escapes through the float-valve-controlled outlet 43 which leaves the meter submerged in liquid that is substantially free from gas and air. Upon opening of the nozzle 31 the liquid in the vessel in which the meter is submerged is drawn therefrom by the dispensing pump 26 causing operation of the meter and the indicating mechanism connected therewith and delivery of the liquid measured by the meter to the customer. Upon closing of the nozzle the discharge of liquid from the dispensing pump is stopped which causes opening of the by-pass valve 38 and consequent circulation of the liquid in the dispensing pump, whereupon withdrawal of liquid through the meter from the vessel is discontinued while the supply of liquid as it is delivery to the vessel passes freely therefrom through the overflow pipe back into the storage tank. Upon replacing the nozzle on the hose hook the motor switch is opened so that operation of the motor and both pumps is estopped.

During the dispensing operation the transient liquid in the vessel and operation of the meter are readily observable by the customer and attendant whereby proper or irregular operation of the dispenser is readily determined.

The indicating mechanism shown on the drawings is illustrative generally of a class of suitable counting, liquid-quantity indicating or price-computing apparatuses operable by or forming part of a meter mechanism, rather than of any particular type.

By the indicating mechanism, when progressed by the meter, is ascertained the quantity of liquid delivered during the dispensing operation, the computed monetary value thereof, or both the quantity and value according to the type of indicator that is installed in the dispenser.

I claim:—

1. In a liquid dispenser, a pedestal, a display vessel on said pedestal provided with a float-valve-controlled vent and an overflow pipe, a meter positioned partially within the vessel and apertured to receive liquid therefrom, said meter including means to indicate the quantity flow therethrough, a dispensing pump connected with the outlet of the meter for withdrawing liquid from the vessel through the meter and having a spring-restrained by-pass valve between its suction and discharge chambers, a dispensing line connected with the outlet of said pump terminating with a hose provided with a manually-operated valve-controlled nozzle, a second pump connected with a storage tank and said vessel for supplying liquid from said tank to said vessel, a motor for driving both of said pumps concurrently, having operative connections therewith arranged so that delivery of liquid through said second pump is greater than that delivered through said dispensing pump, and a switch controlling the circuit for said motor.

2. In a liquid dispenser, a supported transparent display vessel having an overflow pipe, means for supplying said vessel with liquid, a meter having an apertured portion thereof extending into and exposed to view in the vessel and disposed for reception of liquid therefrom through its apertured portion, means in connection with said meter for indicating the quantity flow of liquid drawn therethrough, a dispensing pump connected with the outlet of said meter for drawing liquid therethrough from said vessel, means for actuating said supplying means and said pump, and a dispensing line connected with the discharge outlet of the pump having a manually-operated valve-controlled nozzle.

3. In apparatus of the class described, a storage tank, a dispenser consisting of a supported display vessel having an overflow pipe connected with said tank and provided with a float-valve-controlled vent, a filling pump having connections with said tank and vessel for filling the latter, a meter connected with and disposed to receive liquid from said vessel, a dispensing pump connected with the outlet of said meter for withdrawing liquid from said vessel through said meter and having a spring-restrained by-pass valve between its suction and discharge chambers, driving means for said pumps arranged so the liquid flow through said filling pump is greater than through said dispensing pump, and a dispensing line connected with the discharge chamber of said dispensing pump terminating with a valve-controlled nozzle.

4. In apparatus of the class described, a storage tank, a dispenser having a supported display vessel provided with an overflow pipe connected with said tank, and having also a float-valve-controlled vent, a filling pump having connections with said tank and vessel by which liquid from said tank is circulated through said vessel and overflow pipe, a meter connected with and disposed to receive liquid from said vessel, a dispensing pump having a spring-restrained by-pass valve between its suction and discharge chambers and connected with the outlet of said meter for withdrawing liquid from said vessel through said meter, means for actuating said pumps concurrently and arranged so the liquid flow through said filling pump is greater than that through said dispensing pump, and a dispensing line connected with the discharge outlet of the dispensing pump.

5. In apparatus of the class described, a storage tank, a dispenser including a supported display vessel having an overflow pipe connected with said tank and provided with a float-valve-controlled vent, a filling pump connected with the tank and vessel by which liquid from the tank is circulated through the vessel and overflow pipe, dispensing means including a meter, a dispensing pump and a manually-operated valve-controlled nozzle connected in a discharge line in the order named, said meter being connected with said vessel to receive liquid therefrom, said dispensing pump having a spring-restrained by-pass valve to permit circulation of liquid in said dispensing pump when said nozzle is closed, and a motor having connections with said pumps arranged for concurrent operation thereof so arranged that the quantity of liquid supplied to the vessel is in excess of that withdrawn therefrom through the dispensing means.

GEORGE U. BRAKE.